United States Patent
Goering et al.

(10) Patent No.: US 7,712,488 B2
(45) Date of Patent: May 11, 2010

(54) FIBER ARCHITECTURE FOR PI-PREFORMS

(75) Inventors: Jonathan Goering, York, ME (US); Kenneth Ouellette, Kennebunk, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 96 days.

(21) Appl. No.: 12/059,060

(22) Filed: Mar. 31, 2008

(65) Prior Publication Data

US 2009/0247034 A1   Oct. 1, 2009

(51) Int. Cl.
*D03D 11/02* (2006.01)
*D03D 13/00* (2006.01)
*D03D 23/00* (2006.01)
*D03D 25/00* (2006.01)

(52) U.S. Cl. ............... 139/384 R; 139/11; 139/DIG. 1; 442/203; 442/205

(58) Field of Classification Search ............. 139/383 R, 139/384 R, 411, 11, DIG. 1; 442/299.1, 442/192, 292.1, 203, 205
See application file for complete search history.

(56) References Cited

U.S. PATENT DOCUMENTS

| | | | |
|---|---|---|---|
| 4,256,790 A |   | 3/1981 | Lackman et al. |
| 4,331,349 A |   | 5/1982 | Funahashi |
| 4,331,495 A |   | 5/1982 | Lackman et al. |
| 4,671,470 A | * | 6/1987 | Jonas ......................... 244/119 |
| 4,725,485 A | * | 2/1988 | Hirokawa ................... 442/187 |
| 4,782,864 A | * | 11/1988 | Abildskov ............. 139/384 R |
| 4,922,968 A |   | 5/1990 | Bottger et al. |
| 5,026,595 A | * | 6/1991 | Crawford et al. ............ 428/193 |
| 5,085,252 A |   | 2/1992 | Mohamed et al. |
| 5,126,190 A | * | 6/1992 | Sakatani et al. ............. 442/205 |
| 5,429,853 A |   | 7/1995 | Darrieux |
| 5,451,448 A | * | 9/1995 | Sawko et al. ................ 428/175 |
| 5,465,760 A | * | 11/1995 | Mohamed et al. ............. 139/11 |
| 5,772,821 A |   | 6/1998 | Yasui et al. |

(Continued)

FOREIGN PATENT DOCUMENTS

WO   WO 02/016197 A   2/2002

(Continued)

OTHER PUBLICATIONS

The International Search Report and Written Opinion issued by the European Patent Office for corresponding international application PCT/US2009/038761 mailed Jul. 13, 2009.

*Primary Examiner*—Bobby H Muromoto, Jr.
(74) *Attorney, Agent, or Firm*—Frommer Lawrence & Haug LLP; Ronald R. Santucci

(57) ABSTRACT

A woven preform for a reinforces composite material, which may be woven flat and folded into a shape. The preform has a three-dimensional weave architecture with fill fibers woven to provide layer-to-layer interlocking of layers of warp fiber as well as interlocking of fibers within each layer. At least two legs extend from a base, the base and legs each having at least two layers of warp fibers. The legs can be connected at a symmetrical or asymmetrical, distributed-column intersection, with an even or odd number of columns of warp fibers being located between the legs. The outer ends of the base and/or legs preferably have tapers formed from terminating layers of warp fibers in a stepped pattern.

23 Claims, 6 Drawing Sheets

U.S. PATENT DOCUMENTS

| | | | | |
|---|---|---|---|---|
| 5,783,279 | A * | 7/1998 | Edgson et al. | 428/116 |
| 5,785,094 | A | 7/1998 | Yoshida | |
| 5,899,241 | A | 5/1999 | David et al. | |
| 6,010,652 | A | 1/2000 | Yoshida | |
| 6,019,138 | A * | 2/2000 | Malek et al. | 139/1 R |
| 6,103,337 | A | 8/2000 | Burgess | |
| 6,283,168 | B1 | 9/2001 | Gu et al. | |
| 6,374,570 | B1 | 4/2002 | McKague, Jr. | |
| 6,418,973 | B1 | 7/2002 | Cox et al. | |
| 6,446,675 | B1 * | 9/2002 | Goering | 139/11 |
| 6,520,706 | B1 | 2/2003 | McKague, Jr. et al. | |
| 6,589,472 | B1 | 7/2003 | Benson et al. | |
| 6,676,882 | B2 | 1/2004 | Benson et al. | |
| 6,712,099 | B2 * | 3/2004 | Schmidt et al. | 139/383 R |
| 6,718,713 | B2 | 4/2004 | McKague, Jr. et al. | |
| 6,733,211 | B1 | 5/2004 | Durie | |
| 6,733,862 | B2 | 5/2004 | Goering | |
| 6,821,368 | B2 | 11/2004 | Benson et al. | |
| 6,835,261 | B2 | 12/2004 | Schmidt | |
| 6,874,543 | B2 * | 4/2005 | Schmidt et al. | 139/383 R |
| 6,890,612 | B2 * | 5/2005 | Goering | 428/57 |
| 6,899,941 | B2 * | 5/2005 | Goering et al. | 428/121 |
| 6,913,045 | B2 | 7/2005 | Fantino et al. | |
| 7,014,805 | B1 | 3/2006 | Reis et al. | |
| 7,077,167 | B2 | 7/2006 | Nayfeh et al. | |
| 7,198,692 | B2 | 4/2007 | Bersuch et al. | |
| 7,244,487 | B2 * | 7/2007 | Brantley et al. | 428/119 |
| 2002/0081416 | A1 * | 6/2002 | Goering | 428/121 |
| 2002/0081925 | A1 * | 6/2002 | Goering | 442/215 |
| 2002/0081926 | A1 * | 6/2002 | Goering et al. | 442/218 |
| 2002/0090874 | A1 | 7/2002 | McKague, Jr. et al. | |
| 2002/0192450 | A1 * | 12/2002 | Schmidt et al. | 428/299.1 |
| 2003/0041948 | A1 | 3/2003 | Bersuch et al. | |
| 2003/0056847 | A1 | 3/2003 | Schmidt et al. | |
| 2003/0116267 | A1 | 6/2003 | Sheahen et al. | |
| 2004/0023581 | A1 | 2/2004 | Bersuch et al. | |
| 2006/0121809 | A1 * | 6/2006 | Goering | 442/246 |
| 2007/0120288 | A1 | 5/2007 | Ashton et al. | |
| 2008/0009210 | A1 * | 1/2008 | Goering | 442/181 |
| 2008/0261474 | A1 * | 10/2008 | Goering | 442/195 |
| 2009/0149100 | A1 * | 6/2009 | Goering | 442/203 |
| 2009/0163100 | A1 * | 6/2009 | Goering | 442/205 |

FOREIGN PATENT DOCUMENTS

| | | | |
|---|---|---|---|
| WO | WO 02/066235 A | 8/2002 | |

* cited by examiner

FIBER ARCHITECTURE FOR PI-PREFORMS

CROSS-REFERENCE TO RELATED APPLICATIONS

Related applications are U.S. patent application Ser. No. 12/059,060 filed Mar. 31, 2008 and U.S. patent application Ser. No. 12/260,689 filed Oct. 29, 2008.

BACKGROUND OF THE INVENTION

1. Field of the Invention

This invention generally relates to woven preforms and particularly relates to woven preform used in a reinforced composite material, which can be woven flat and folded into its final shape without producing undesirable loops in the preform.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the intersticial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

An example of an intersecting configuration is set forth in U.S. Pat. No. 6,103,337, the disclosure of which is incorporated herein by reference. This reference sets forth an effective means of joining together two reinforcing plates into a T-form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface (s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the matrix material and not of the adhesive.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No.

4,331,495 and its method divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured": i.e., cured simultaneously. Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a simple structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform. Weave construction and automation of preform weaving was in its infancy and provided only a small advantage over conventional laminated, fiber-wound, or braided composites, limiting the versatility of the preforms.

Another approach would be to weave a two dimensional ("2D") structure and fold it into 3D shape. However, this typically results in parts that distort when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. An example of a 3D preform weave architecture, which may lead to ripples or loops in areas where the preform is folded, is disclosed in U.S. Pat. No. 6,874,543, the entire content of which is incorporated herein by reference. The weave architecture disclosed in the '543 patent is difficult to weave because of the use of so called "half-picks." A half-pick is a weft or fill fiber or yarn that runs less than half way across the width of the preform. When this pick is inserted by the shuttle, a length of fiber greater than half the width of the preform continues to be pulled off the bobbin. This excess fiber is not woven into the preform on this pick, and when the next pick is inserted, which is also a half-pick, there is too much fiber in excess, and a loop gets formed between the legs of the Pi. This effect is shown schematically in FIG. 2.

Preform 10 has a base 20, two edges 5, 15 and two legs 25, 35 extending from the base 20, each leg 25, 35 having an inner surface 22 and an outer surface 102. Each fill fiber 14 in the structure has a beginning at the first edge 5 of the base 20, then extends to the second edge 15 of the base 20, then extends back toward a central section of the base 20, then exits the layers of the base 20 and extends into the layers of one of the legs 25 before extending into the layers of the other of the leg 35. As it can be seen from the figure, excess fiber 14 is pulled from the bobbin as the shuttle passes across the preform 10, and the weft does not weave into this side of the preform 20 with the use of half-picks. Therefore, a loop 30 remains when the shuttle passes back across the preform 20. The fill fiber 14 after exiting the layers of the legs 25, 35, extends back into the layers of the base 20 for returning to the first edge 5 of the base 20. FIG. 3 depicts the use of these half-picks in more detail, where it can be seen that the design uses five shuttle motions for a complete pick sequence; four half picks and one full pick. This type of shuttle motion not only reduces the productivity on the loom, but also, causes loops and ripples in areas where the as-woven fiber lengths are too long, as discussed above. These distortions cause undesirable surface anomalies and reduce the strength and stiffness of the preform.

Accordingly, there is a need for a 3D preform which provides for an alternative approach and/or an improved method of creating 3D preforms and/or reinforced composite structures without forming loops or ripples in the structure.

SUMMARY OF THE INVENTION

It is therefore a principal object of the invention to provide for a 3D preform of improved quality, without any loops or ripples in the structure.

It is a further object of the invention to provide for a 3D preform which is of a design which is an alternative to and/or an improvement on existing preforms and/or reinforced composite structures heretofore available.

It is another object of the invention to provide for a novel method of producing a 3D preform with improved quality, which eliminates loop formation, and reduces weaving time by replacing five shuttle motions with three, thereby providing for a better preform in lesser amount of time.

It is a further object of the invention to provide for such a 3D preform which may be folded into shape without distortion of the fibers comprising the preform.

A yet further object of the invention is to provide for a 3D preform which is particularly useful in forming Pi-shaped reinforced composites.

These and other objects and advantages are achieved by providing for a 3D woven preform that can be woven flat and then folded into its final shape prior to impregnation of resin without producing an undesirable distortion in the fibers. This is accomplished by adjusting the length of the fibers during weaving such that the fibers lengths are equalized when the preform is folded into shape providing for a smooth transition at the fold. This technique, while particularly suited for form Pi-shaped woven preforms, may be utilized with various shapes. Also, while reference is made to woven preforms, its applicability to non-wovens, such as braided or stitched bonded, for example, will be apparent to one skilled in the art.

Accordingly, one embodiment of the invention is a preform for mechanical or structural joints having a three-dimensional weave architecture with fill fibers woven to provide layer-to-layer interlocking of layers of warp fiber as well as interlocking of fibers within each layer. The woven preform transfers out-of-plane loading through directed fibers to minimize inter-laminar tension. The preform has a base and at least two legs extending from the base, the base and legs each having at least two layers of warp fibers.

The fill fibers follow a weave sequence that carries them through a portion of the base, then into the legs, and finally through the opposite portion of the base. The legs can be connected at a symmetrical, distributed-column intersection, with an odd number of columns of warp fibers being located between the legs. The preform may, however, have a non-symmetrical structure, with equal or unequal leg lengths. The preform may also have an even number of columns of warp fibers between the legs, and the legs may be perpendicular or non-perpendicular or angled to the base. The outer ends of the base and/or the legs preferably have tapers formed from terminating layers of warp fibers in a stepped pattern.

Another embodiment of the present invention is a method of forming a preform for use in reinforced composite materials. The preform is formed to have a three-dimensional weave architecture with fill fibers woven to provide layer-to-layer interlocking of layers of warp fiber as well as interlocking of fibers within each layer. The woven preform transfers out-of-plane loading through directed fibers to minimize inter-laminar tension. The preform has a base and at least two legs extending from the base, the base and legs each having at least two layers of warp fibers. The fill fibers follow a weave sequence that carries them through a portion of the base, then into the legs, and finally through the opposite portion of the base. The legs can be connected at a symmetrical or non-symmetrical, distributed-column intersection, with an even or odd number of columns of warp fibers being located between the legs. The legs may be perpendicular or non-perpendicular or angled to the base.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

Figure 4:
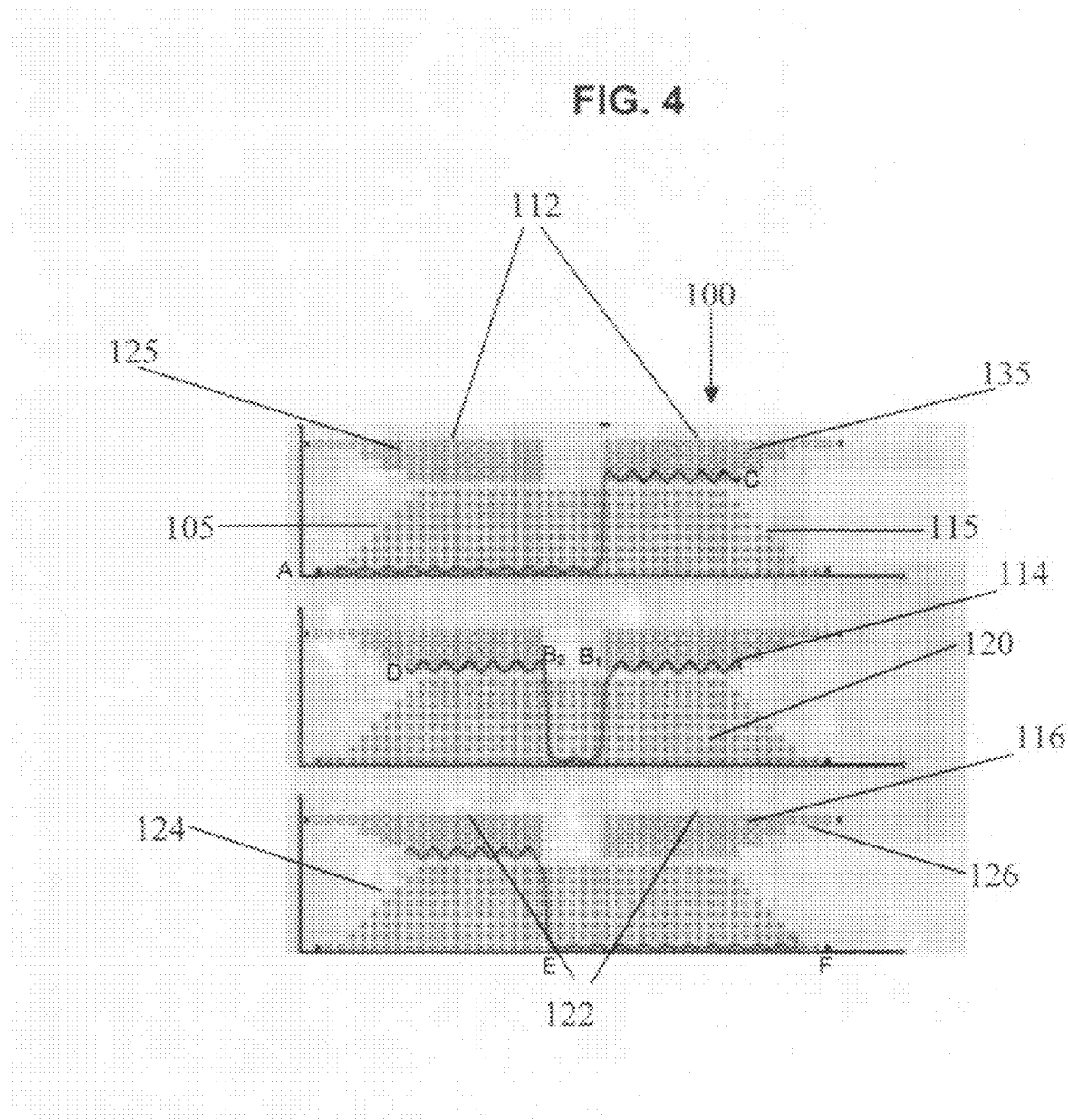
FIG. 4 is a schematic end view of a Pi-shaped preform depicting the formation of full-picks and fiber architecture therein, according to one embodiment of the invention.
Figure 5:
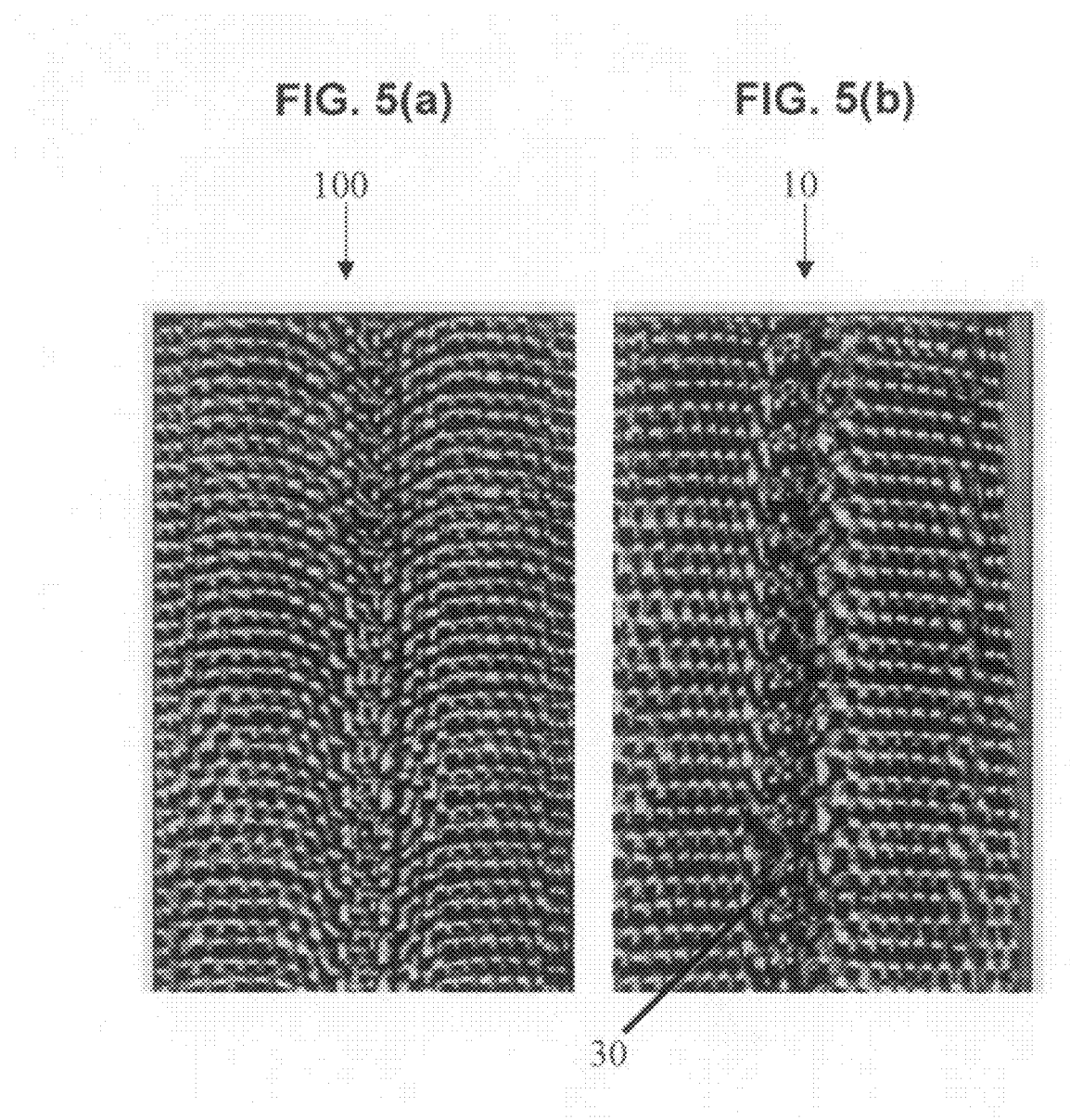
FIGS. 5(a) & 5(b) are photographs showing a preform according to the invention and a preform as disclosed in a prior art, respectively.
Figure 6:
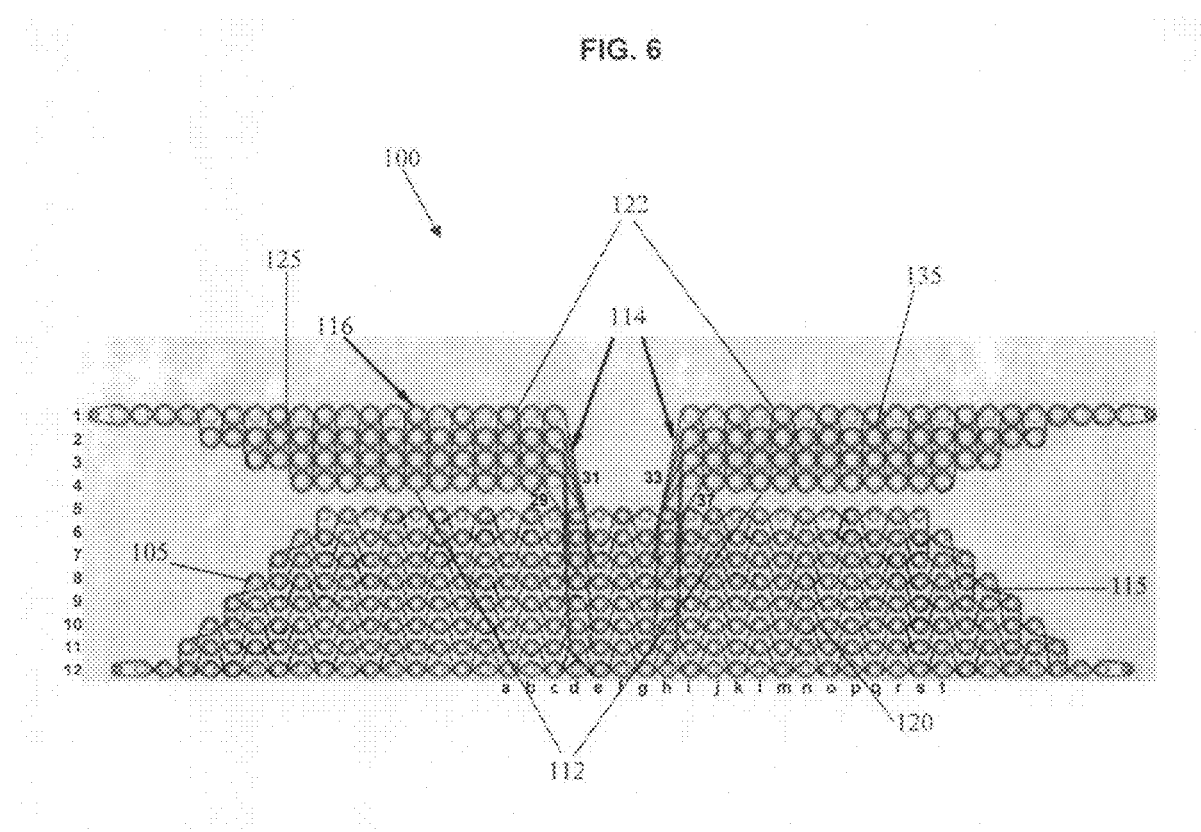
FIG. 6 is a schematic end view of a Pi-shaped preform depicting the fiber architecture therein, according to one embodiment of the invention.

FIGS. 1, 4, 5a and 6 illustrate a preferred embodiment of a three-dimensional preform 100. Preform 100 is formed by weaving one or more fill fibers 114 in a pattern through a plurality of warp fibers 116, warp fibers 116 extending perpendicularly to the plane of the pattern. In FIGS. 4 and 6, the complete pattern used to form Pi-shaped preform 100 is illustrated, where fill fibers 114 are shown in the viewing plane, whereas warp fibers 116 are shown as perpendicular to the viewing plane. Fibers 114, 116 are shown as spaced apart in the schematic views of the architecture, though fibers 114, 116 are compacted together when actually woven into a completed preform 100.

Turning now to FIG. 4, all warp fibers 116 in preform 100 are generally parallel to each other, with slight undulations along the longitudinal length of each fiber 116, and are arranged in generally vertical columns. Preform 100 is preferably woven from materials used for typical composite structures, for example, fiberglass and carbon fibers, and is woven to have a base 120 and at least two legs 125, 135 extending from base 120, forming a Pi-shaped profile. The legs 125, 135 may be perpendicular or non-perpendicular or angled to the base 120. Base 120 and legs 125, 135 each comprise at least two layers of warp fibers 116 and are shown as having optional tapered edges. For ease of weaving, preform 100 is woven with legs 125, 135 laid over against base 120, though legs 125, 135 are intended for use in an upright position, forming a clevis, such as, for example shown in FIG. 1. Base 120 is shown having eight layers of warp fibers 116, and legs 125, 135 are shown having four layers of warp fibers 116.

Optionally, as shown, warp fibers 116 in base 120 have a smaller cross-sectional area than warp fibers 116 in legs 125, 135. By using smaller warp fibers 116 only in base 120 and not in legs 125, 135, the increase in time required to weave the architecture on a weaving loom is minimized while still providing a stronger base 120 in preform 100 through a greater amount of interlocking of warp fibers 116.

Referring back to FIG. 4, preform 100 is illustrated with the weave pattern beginning at one end 105 of the base 120, which is shown at the left of base 120. In a typical portion of the weave sequence, fill fiber 114 alternates over and under warp fibers 116 of one layer during each rightward pass, interlocking fibers 116 of that layer. Also, in a typical portion of the weave sequence, fill fiber 114 alternates over and under warp fibers 116 of two adjacent layers during each leftward pass, interlocking the layers to each other. As shown in the FIGS. and described below, portions of the weave sequence, including those within legs 125, 135, at edges, and at outer surfaces of preform 100, may differ from these general statements.

As shown in FIG. 4, the general weave sequence begins with fill fiber 114 at position A and extending toward the center of the base 120 and then into an outer side 112 of one of the legs 135 at position B1. The fill fiber 114 then extends to position C at the far right end right of leg 135. From position C, fill fiber 114 weaves back along the same line, toward the center of base, from which point fill fiber 114 extends downward into base 120 and back into the outer side 112 of the other leg 125 to position D at the far most left end of leg 125. Fill fiber 114 then weaves back along the same line, toward the center of base 120 and extends back into base 120 at position B2, passes through central columns of warp fibers 116 located between legs 125, 135, then back into base 120 at position E and reaches position F at the other end 115 of base 120. This forms a complete weave sequence of fill fiber 114, which basically combines four half-picks together and forms three full-picks, as depicted in FIG. 4. Terminating layers of warp fibers 116 in a stepped pattern form tapered edges on base 120 and legs 125, 135, such as taper 124 on the left lateral edge of base 120 and taper 126 on leg 135.

To complete one unit cell, or vertical section, the passes of fill fiber 114 across preform 100 are repeated for adjacent layers of warp fibers 116 until all layers are interlocked. The fill pattern is repeated to form adjacent vertical sections, creating continuous lengths of preform.

FIG. 6 particularly shows the weave pattern used for forming legs 125, 135 and base 120 in a Pi-shaped preform 100. Base 120 is shown with eight layers of warp fibers 116, and legs 125, 135 are shown with four layers of warp fibers 116, though the pattern can be modified to work with more or fewer layers of warp fibers in base 120 and legs 125, 135. In other words, the base 120 can have more layers than each of the legs 125, 135 or vice versa. The weave pattern provides for interlocking of warp fibers 116 within a layer, and interlocking between layers of warp fibers. Adjacent layers are interlocked by running a portion of fill fibers 114 over a warp fiber 116 in a first layer in a first column and below a warp fiber in an adjacent, second layer in an adjacent, second column, the second layer being below the first layer. Legs 125, 135 are woven in a laid-over, horizontal position, as shown, while the pattern is woven. During installation, each leg 125, 135 is moved to a vertical, standing position, the width of each leg 125, 135 when standing upright comprising four layers.

Preform 100 is improved from previous woven preforms in providing a highly symmetrical, distributed intersection of legs 125, 135 with base 120. Base 120 has three central columns of warp fibers, and two separator columns of warp fibers, which are the adjacent columns to either lateral side of central columns. The use of an odd number of central columns allows the weave to form an approximately mirror image to either lateral side of a central plane of symmetry bisecting the central column, improving the symmetry of load distribution within base 120. While shown as having three central columns, the preferred embodiment of preform 100 may have any odd number of central columns, the number of central columns determining the nominal width of the clevis formed when legs 125, 135 are in an upstanding position. The legs 125, 135 may be perpendicular or non-perpendicular or angled to the base 120.

To symmetrically introduce loads from legs 125, 135 into base 120, such as loads from a member (not shown) bonded between upstanding legs 125, 135, the portions of fill fibers 114 connecting legs 125, 135 are divided into groups of equal or substantially equal numbers of fiber portions. Each group intersects base 120 between one of separator column and central columns or between one of separator column and the remaining right or left lateral columns adjacent that separator column. For example, as shown in FIG. 6, group 29 extends between layers 2 and 4 of leg 125 and base 120, intersecting base 120 between columns c and d. Likewise, group 31 intersects base 120 between columns d and e, group 33 intersects base 120 between columns g and h, and group 37 intersects base 120 between columns h and i. It is to be noted here that although the figures show symmetric geometries, the method of the instant invention may be used in producing asymmetric configurations as well.

Though shown in the preferred location at approximately the center of preform 100, central columns 27 may comprise columns of warp fibers 116 located laterally from the center of preform 100. For example, columns b, c, and d may comprise the central columns, and columns a and e may act as the separator columns. This offsets legs 125, 135 toward an outer edge of base 120, though still providing symmetry in the weave of base 120 about columns b, c, and d and providing the symmetrical distribution of the load from legs 125, 135 into base 120. Tapers, such as tapers 124 and taper 126 are formed on an outer edge of a preform by terminating successive layers of warp fibers at lengths that are shorter than prior layers. For example, FIG. 6 shows layer 5 terminating at column s, whereas layer 6 terminates at column t, layer 5 being one warp fiber 116 shorter than layer 6. Likewise, layer 6 is shorter than layer 7, and this pattern repeats for each adjacent lower layer. A preform having tapered edges in either the base or upstanding legs has a better resistance to peel loads than a preform in which the warp-fiber layers all terminate at the same length. In addition, use of a smaller fiber size for the warp taper fiber provides a smoother, more gradual transition from the preform to the composite laminate to which it is joined. The weave pattern in FIG. 6 is for the eight layers of warp fibers 116 of base 120.

Figure 1:
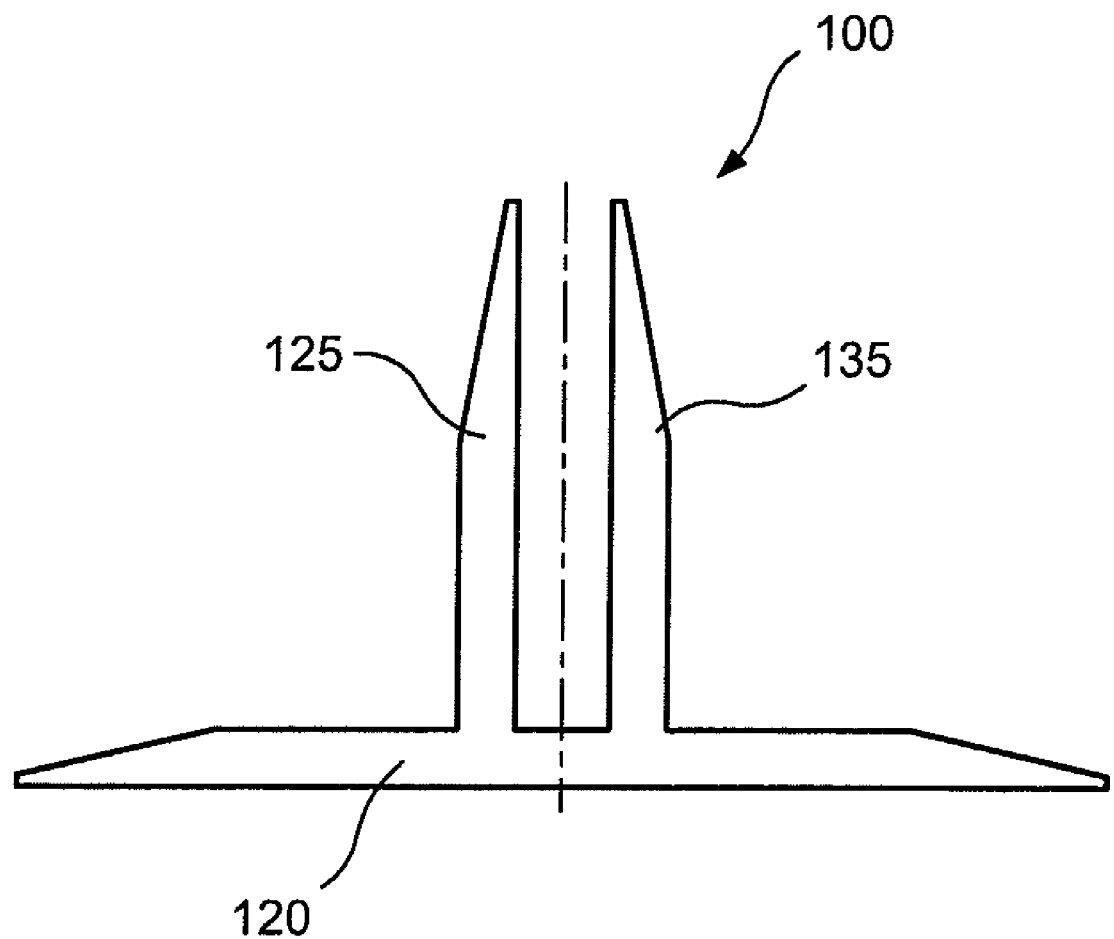
FIG. 1 is a cross-sectional view of a Pi-shaped preform with legs in an upstanding position and flanges on either side of the preform according to one embodiment of the invention.
Figure 2:
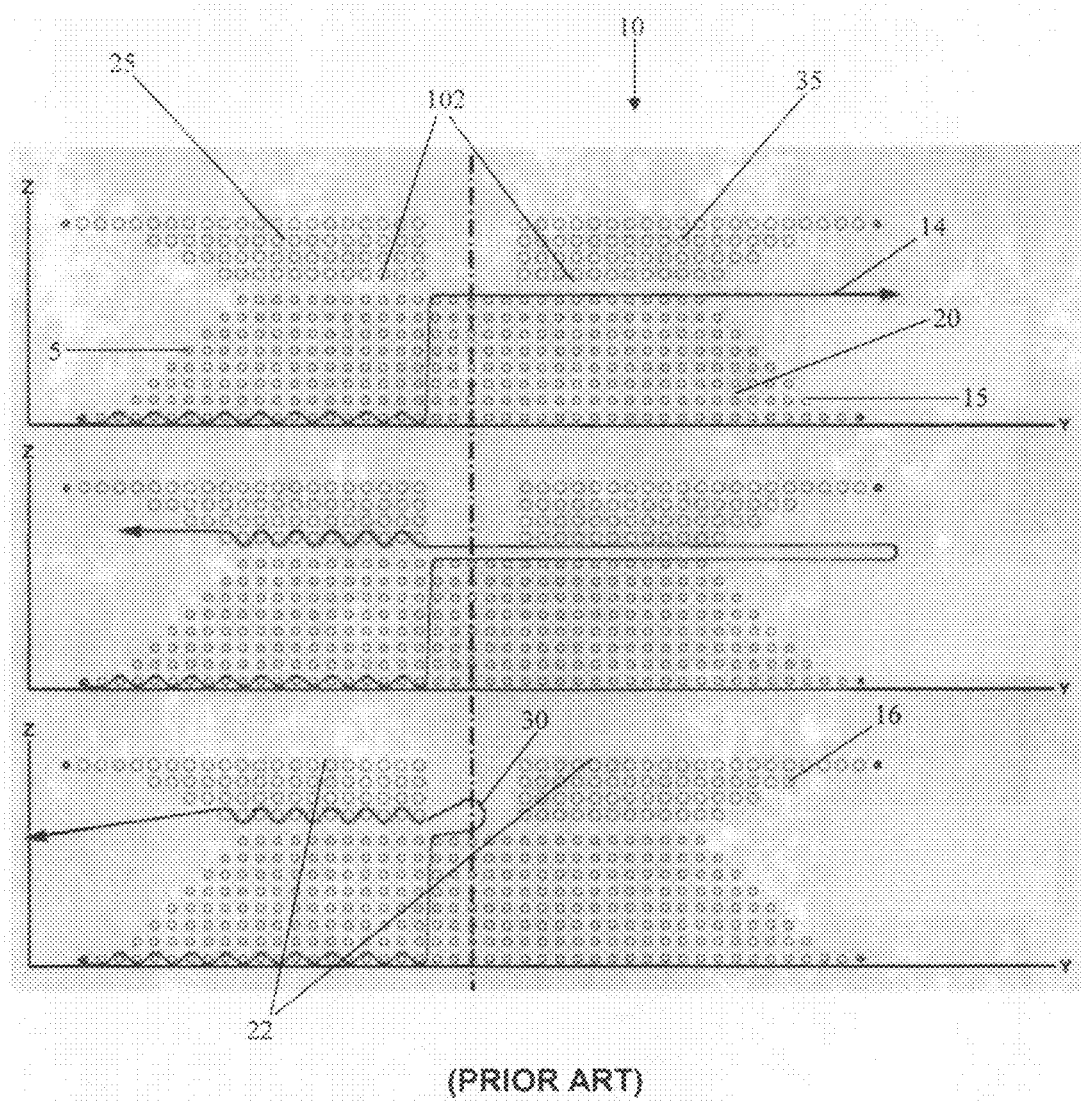
FIG. 2 is a schematic end view of a prior art Pi-shaped preform depicting the formation of loops due to half-picks.
Figure 3:
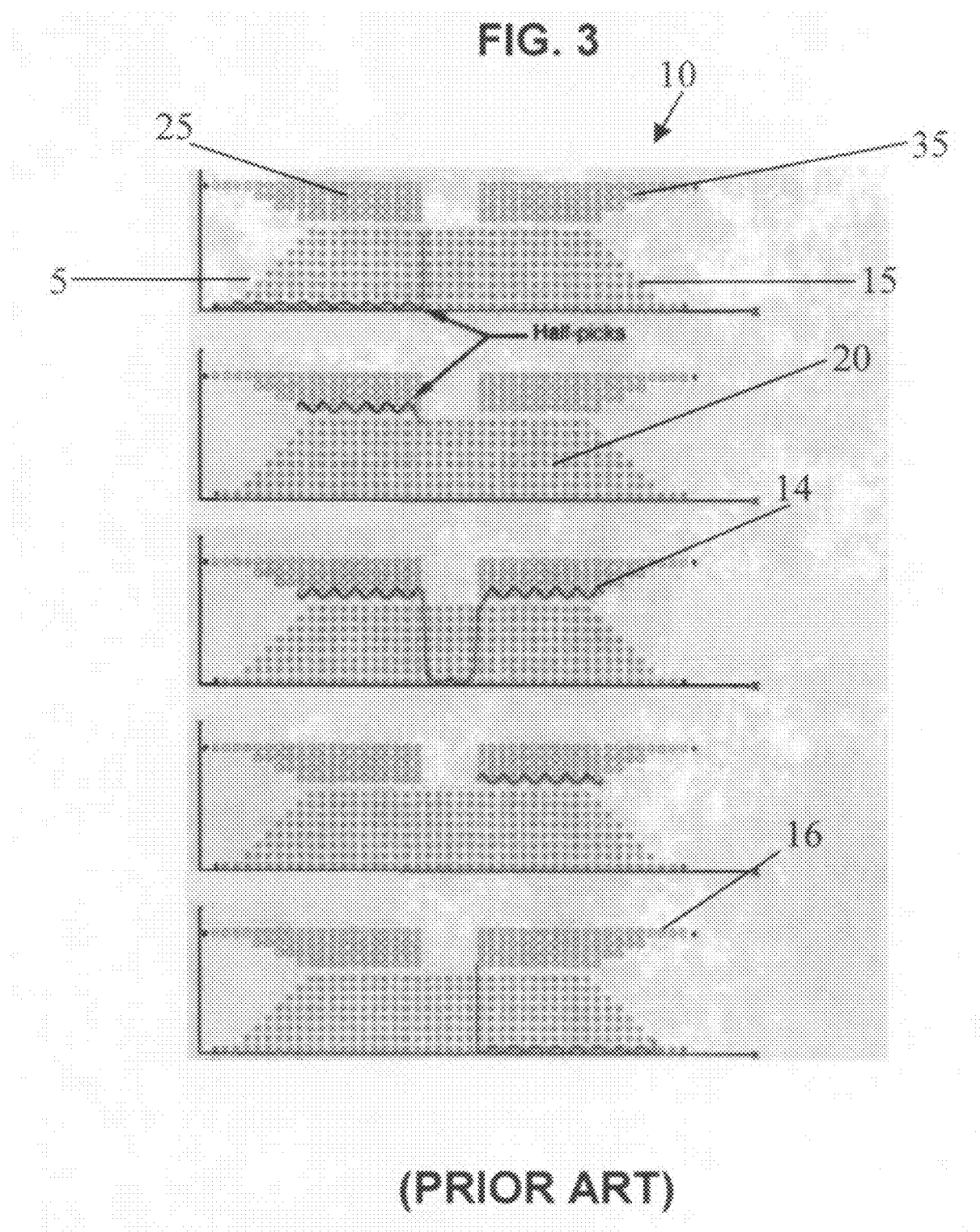
FIG. 3 is a schematic end view of a prior art Pi-shaped preform depicting the formation of half-picks and fiber architecture therein.

Completed, woven, Pi-shaped preform 100 is shown in FIG. 1 with legs 125, 135 in the vertical position, forming a clevis between legs 125, 135. However, the legs 125, 135 may be perpendicular or non-perpendicular or angled to base 120. Preform 100 is woven by repeating the complete weave sequence to form adjacent vertical sections along the longitudinal length of preform 100. The weave process produces continuous lengths of preform 100, which are then cut to the desired lengths for installation. An example of a preform formed according to the invention in comparison with a prior design preform with loops between the upstanding legs is shown in FIGS. 5(a) & 5(b), respectively.

Typically, the preforms are woven using one type of fiber, for example, carbon (graphite) fibers, for both the warp and fill fibers. However, preforms may also be hybrid weave patterns that use fibers made form multiple materials, such as carbon and glass fibers. These patterns can result in preforms having higher toughness, reduced cost, and optimized thermal-expansion characteristics. The weave patterns comprise all warp fibers of one type and all fill fibers of another type, or the weave may have warp and/or fill fibers of alternating types arranged, for example, in a "checkerboard" pattern throughout the layers.

The advantages of the present invention include the ability to weave a high strength and easy-to-use preform for assembling components into structures. The improved weave interlocks the warp fibers of each layer and interlocks the layers to each other, while distributing loads through the preform in a highly symmetrical manner. By having an odd number of columns of warp fibers in the base between the legs of the preform, a weave pattern can be mirrored about a central plane of symmetry. However, this is not necessary for the practice of the invention. The preform may as well have an asymmetrical structure, with equal or unequal leg lengths, or an even number of columns of warp fibers in the base between the legs of the preform.

The present invention also introduces a new and unique type of shuttle motion to produce the preforms, which not only improves the productivity on the loom, but also avoids the formation of loops and ripples in area where the preform is folded, which in turn improves the strength and stiffness of the preform.

Accordingly, the invention provides for an alternative approach and/or an improved method of creating 3D preforms and/or reinforced composite structures without forming loops or ripples in the structure.

Thus by the present invention its objects and advantages are realized and although preferred embodiments have been disclosed and described in detail herein, its scope should not be limited thereby rather its scope should be determined by that of the appended claims.

What is claimed is:

1. A method of forming a woven preform, the method comprising the steps of:

(a) providing a plurality of adjacent layers, each layer having a plurality of warp fibers, the warp fibers being generally parallel to each other and forming generally vertical columns; and (b) weaving a plurality of fill fibers with the layers of warp fibers to form a base and two legs extending from the base, the base and each leg being formed from at least two layers of warp fibers, the base having a first edge and a second edge, each leg having a inner end and an outer end, wherein each fill fiber is woven such that the filler fiber has a beginning at the first edge of the base, then extends across a central section of the base, then exits the layers of the base and extends into the layers of the leg adjacent to the second edge of the base before extending back into and across the central section of the base, and then extends out into the layers of the other of the legs adjacent to the first edge of the base, then exits the layers of the legs and extends back into and across the layers of the central section of the base for extending to the second edge of the base, and wherein the fill fibers interlock the layers of the base, interlock the layers of each leg, and interlock the warp fibers within each layer.

2. The method according to claim 1, wherein the columns of warp fibers include central columns of warp fibers located between the fill fibers connecting one of the legs to the base and the fill fibers connecting the other of the legs to the base, the central columns comprising an odd number of columns and allowing for a substantially mirror-image weave pattern about a central plane of symmetry of the weave architecture.

3. The method according to claim 1, wherein the columns of warp fibers include central columns of warp fibers located between the fill fibers connecting one of the legs to the base and the fill fibers connecting the other of the legs to the base, the central columns comprising an even number of columns and allowing for a substantially asymmetrical weave pattern about a central plane of the weave architecture.

4. The method according to claim 2 or 3, wherein the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

5. The method according to claim 1, wherein the base has more layers than each of the legs or vice versa.

6. The method according claim 1, wherein the edges of the base and/or the legs are formed tapered.

7. The method according to claim 1, wherein the legs are perpendicular or non-perpendicular or angled to the base.

8. A three-dimensional preform weave architecture comprising:

a plurality of adjacent layers, each layer having a plurality of warp fibers, the warp fibers being generally parallel to each other and forming generally vertical columns; and a plurality of fill fibers woven among the layers of warp fibers to form a base and two legs extending from the base, the base and each leg being formed from at least two layers of warp fibers, the base having a first edge and a second edge, each leg having a inner end and an outer end, wherein each fill fiber has a beginning at the first edge of the base, then extends across a central section of the base, then exits the layers of the base and extends into the layers of the leg adjacent to the second edge of the base before extending back into and across the central section of the base, and then extends out into the layers of the other of the legs adjacent to the first edge of the base, then exits the layers of the legs and extends back into and across the layers of the central section of the base for extending to the second edge of the base, and the fill fibers interlocking the layers of the base, interlocking the layers of each leg, and interlocking the warp fibers within each layer.

9. The weave architecture according to claim 8, wherein the columns of warp fibers include central columns of warp fibers located between the fill fibers connecting one of the legs to the base and the fill fibers connecting the other of the legs to the base, the central columns comprising an odd number of columns and allowing for a substantially mirror-image weave pattern about a central plane of symmetry of the weave architecture.

10. The weave architecture according to claim 8, wherein the columns of warp fibers include central columns of warp fibers located between the fill fibers connecting one of the legs to the base and the fill fibers connecting the other of the legs to the base, the central columns comprising an even number of columns and allowing for a substantially asymmetrical weave pattern about a central plane of the weave architecture.

11. The weave architecture according to claim 9 or 10, wherein the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

12. The weave architecture according to claim 8, wherein the base has more layers than each of the legs or vice versa.

13. The weave architecture according claim 8, wherein the edges of the base and/or the legs are tapered.

14. The weave architecture according to claim 8, wherein the legs are perpendicular or non-perpendicular or angled to the base.

15. A method of forming a woven preform, the method comprising the steps of:

(a) providing at least a pair of adjacent base layers of warp fibers for forming a base, the warp fibers being generally parallel to each other and generally arranged in columns;

(b) providing at least two layers of adjacent leg layers of warp fibers for forming a pair of legs, the warp fibers being generally parallel to each other and generally arranged in columns;

(c) weaving at least one fill fiber among the base layers and leg layers for interlocking the warp fibers of each base layer to each other and interlocking the warp fibers of the leg layers to each other, the legs being connected to the base at intersections by portions of the fill fiber extending between each leg and the base, two groups of fill fiber portions connecting each leg to the base, wherein each fill fiber has a beginning at the first edge of the base, then extends across a central section of the base, then exits the layers of the base and extends into the layers of the leg adjacent to the second edge of the base before extending back into and across the central section of the base, and then extends out into the layers of the other of the legs adjacent to the first edge of the base, then exits the layers of the legs and extends back into and across the layers of the central section of the base for extending to the second edge of the base;

(d) weaving an even or odd number of central columns of warp fibers in the base between the intersections of the legs and base; and (e) locating separator columns adjacent the central columns, one of the groups of fill fiber portions for each leg intersecting the base adjacent one side of the corresponding separator column, the other of the groups of fill fiber portions for each leg intersecting the base on the opposite side of the corresponding separator column.

16. The method according to claim 15, wherein the base has more layers of warp fibers than each of the legs or vice versa.

17. The method according to claim 15, wherein the legs are perpendicular or non-perpendicular or angled to the base.

18. A woven preform comprising:

a base having a central portion and two lateral edges;

at least two legs extending from one surface of the base, wherein the preform is woven with a three-dimensional weave pattern, the base and each leg being formed of at least two layers of warp fibers, the warp fibers being generally arranged in columns, at least one fill fiber being woven among the warp fibers for interlocking the warp fibers of the base to each other and interlocking the warp fibers of the legs to each other, the legs being connected to the base at intersections by portions of the fill fiber extending between each leg and the base, two groups of portions of fill fibers connecting each leg to the base;

an even or odd number of central columns of warp fibers in the base, are located between the intersections of the legs and base; and separator columns are located adjacent the central columns, one of the groups of portions for each leg intersecting the base adjacent one side of the corresponding separator column, the other of the groups for each leg intersecting the base on the opposite side of the corresponding separator column, wherein each fill fiber has a beginning at the first edge of the base, then extends across a central section of the base, then exits the layers of the base and extends into the layers of the leg adjacent to the second edge of the base before extending back into and across the central section of the base, and then extends out into the layers of the other of the legs adjacent to the first edge of the base, then exits the layers of the legs and extends back into and across the layers of the central section of the base for extending to the second edge of the base.

19. The woven preform according to claim 18, wherein the base has more layers of warp fibers than each of the legs or vice versa.

20. The woven preform according to claim 18, wherein the legs are perpendicular or non-perpendicular or angled to the base.

21. The method according to claim 1 or 15, wherein the legs are equal or unequal in length.

22. The weave architecture according to claim 8, wherein the legs are equal or unequal in length.

23. The woven preform according to claim 18, wherein the at least two legs are equal or unequal in length.

\* \* \* \* \*